United States Patent [19]

Skafvenstedt et al.

[11] 4,053,902

[45] Oct. 11, 1977

[54] FLUID PUMP FOR A WRITING DEVICE

[75] Inventors: Bengt Skafvenstedt, Stockholm; Sture Ahlgren, Vaellingby; Eberhard Tschuertz, Jaerfaella, all of Sweden

[73] Assignee: Siemens Aktiengesellschaft, Berlin & Munich, Germany

[21] Appl. No.: 745,574

[22] Filed: Nov. 29, 1976

[30] Foreign Application Priority Data

Dec. 22, 1975 Germany ............................ 2558063

[51] Int. Cl.[2] ........................ G01D 15/16; B43K 5/04; B43K 5/18; F04B 7/04

[52] U.S. Cl. ................................ 346/140 R; 401/145; 401/150; 417/489

[58] Field of Search ............. 346/75, 140 R; 401/145, 401/150; 417/435, 489

[56] References Cited

U.S. PATENT DOCUMENTS 2,569,903 10/1951 Santarelli ......................... 417/489 X

*Primary Examiner*—George H. Miller, Jr.

*Attorney, Agent, or Firm*—Hill, Gross, Simpson, Van Santen, Steadman, Chiara & Simpson

[57] ABSTRACT

A pump mechanism for delivering ink or the like writing fluid from a reservoir to a point of utilization such as a writing device. The mechanism includes a piston slidable in a cylinder for drawing ink into the cylinder during a suction stroke and discharging the ink during a pumping stroke. The cylinder is formed by a cylinder wall which includes a frusto-conical portion tapered inwardly in a direction away from the piston. The piston comprises a single plastic member having a forward end portion which faces and cooperates with the tapered portion of the cylinder wall and which has an outside diameter which is greater than the smallest diameter of the tapered cylinder wall portion, whereby the forward end portion of the piston engages the tapered cylinder wall portion as the piston moves forward during a pumping stroke. The front or forward wall of the piston is recessed to enable the forward end portion of the piston to deform and slidingly engage the tapered cylinder wall in sealing engagement as the piston moves forward in a pumping stroke. The forward end portion moves out of engagement with the tapered cylinder wall portion as the piston moves backward during a suction stroke.

7 Claims, 1 Drawing Figure

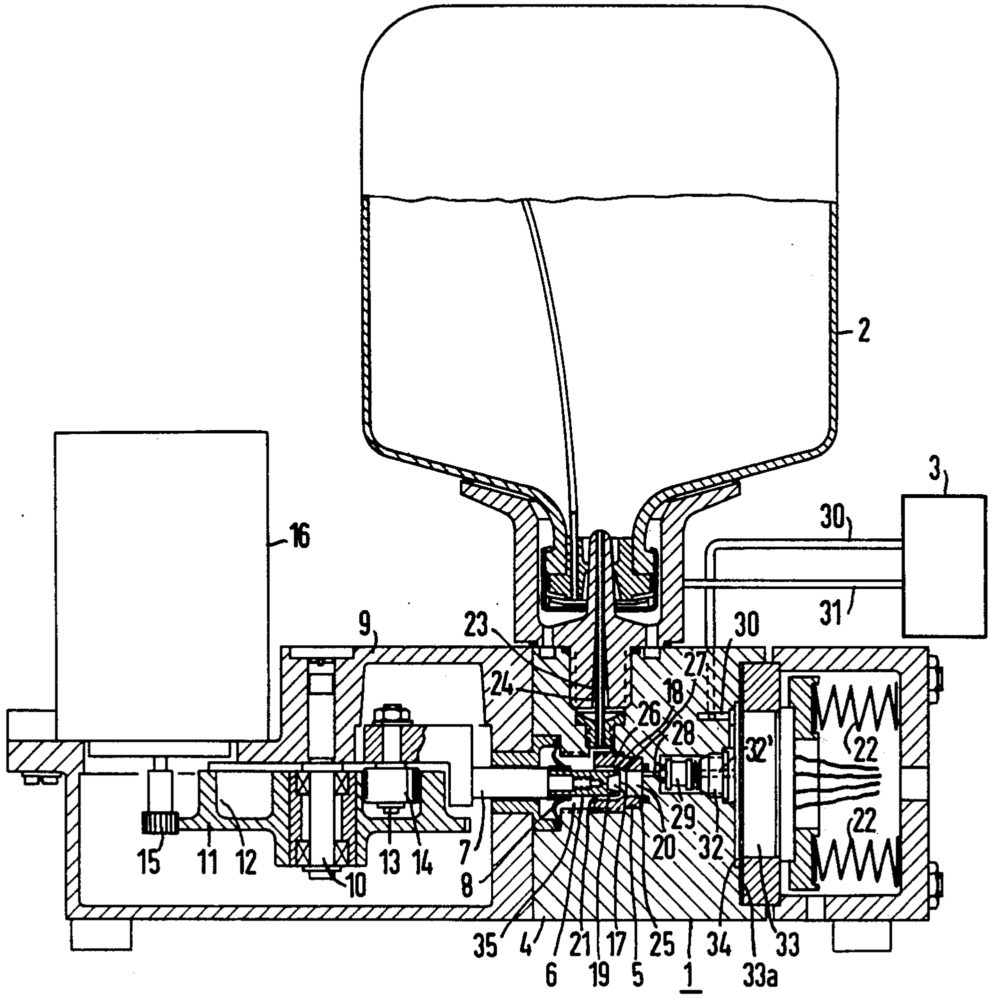
2
3
30
31
16
9
23
24
30
27
18
26
28
32'
22
22
29
32
20
15
11
12
10
13
14
7
8
35
4
21
17
25
34
33
33a
6
19
5
1

FLUID PUMP FOR A WRITING DEVICE

BACKGROUND OF THE INVENTION

This invention relates generally to fluid pumps and more particularly to a pump for delivering ink or the like writing fluid from a reservoir to a writing device. The pump of the present invention comprises a mechanism including a housing, a cylinder formed in the housing, a piston slidable within the cylinder and piston drive means for moving the piston forward and backward within the cylinder to provide a pumping stroke and a suction stroke.

Most known ink pumping mechanisms of this general description comprise a metal spring-loaded piston actuated by an eccentrically mounted wheel, and further include one or more spring loaded valves. Generally, the previously known constructions are complicated in design and have a relatively short useful life, due to a decrease in pumping effect, which in turn is proportional to the reduction in the effect of the spring of the spring-loaded piston.

An object of the present invention is to overcome these deficiencies and to provide a pump for ink or the like writing fluids which is relatively simple in design, inexpensive in manufacture and capable of having a long, useful life.

SUMMARY OF THE INVENTION

These and other objects of the invention, which will be apparent hereinafter, are achieved, in accordance with the principles of the present invention, by providing a pumping mechanism in which the cylinder in which the piston resides comprises a frusto-conical cylinder wall portion tapered inwardly in a direction away from the piston. The piston is a one-piece plastic member having a front wall in which a recess is formed to permit radial deformation. The leading edge of the piston engages the tapered cylinder wall portion as the piston moves forwardly in a pumping stroke, thereby producing a sealing engagement with the cylinder wall. As the piston is moved backward during a suction stroke, the leading end of the piston resiliently expands to its free-state configuration and ultimately moves out of engagement with the cylinder wall.

As a consequence of this arrangement, an improved sealing arrangement is provided between the piston and the cylinder wall, the design of the pump mechanism is simplified, wear is reduced, efficiency is increased and the useful life of the pump mechanism is enhanced.

Many other objects and advantages of the present invention will become manifest to those skilled in the art upon making reference to the drawings attached hereto and the following description of the preferred embodiment.

BRIEF DESCRIPTION OF THE DRAWING

The drawing is a vertical sectional view of a pump mechanism incorporating the principles of the present invention.

DESCRIPTION OF THE PREFERRED EMBODIMENT

Referring to the drawing, there is disclosed a fluid pump mechanism, indicated generally at reference numeral 1, for pumping ink or the like writing fluid from an ink reservoir or container 2 to a writing device indicated at reference numeral 3. The writing device 3 may be one of many well known types and may correspond, for example, to the writing device disclosed in U.S. Pat. No. 2,566,443.

The pump mechanism 1 comprises a pump housing 4 in which is formed a cylinder 5. A piston 6 is carried for slidable movement within the cylinder 5. The piston 6 is made of a one-piece plastic member and is driven forward during a pumping stroke to deliver ink from the cylinder 5 to the writing device 3, and is moved backward in a suction stroke to draw ink from the reservoir 2 into the cylinder 5.

The means for driving the plastic piston 6 forward and backward comprises, in the embodiment illustrated, a toothed wheel or gear 11, which is mounted for rotation on a shaft 10 journalled in a gear housing 9. A cam follower groove 12 is formed in the gear 11 and disposed therewithin is a rotatable cam follower 14 mounted for rotation on a shaft 13 and connected to a piston rod 7 which, in turn, is fixedly connected to the piston 6. The gear 11 is rotated by means of a pinion 15 which in turn is driven by a suitable driving mechanism such as, for example, an electric motor indicated at reference numeral 16.

The interior of the pump housing 9 is partitioned and separated from the working portion of the cylinder 5 by means of a plastic membrane 8 which is connected to both the pump housing 4 and the plastic piston 6.

The one-piece plastic piston 6 comprises a forward end portion 18 having a front radial wall 25 in which is formed a recess or cavity 17. The cylinder 20 is formed by a cylinder wall 26 having a frusto-conical portion 27 tapered inwardly in a direction away from the forward end portion 18 of the piston 6. In order to communicate the cylinder 5 with the reservoir 2, a passage 23 is formed in the pump housing 4, and a glass capillary tube 24 is disposed within the passage 23.

A forward outer wall portion 19 of the piston 6, along with the plastic membrane 8, operate to produce a suction or vacuum condition in a rear portion 35 of the cylinder 5 as the piston 6 is moved backward during a suction stroke. Thus, as the piston 6 is moved backward away from the tapered portion 27 of the cylinder wall 26, ink is drawn from the reservoir 2, through the capillary tube 24 and into the rear portion 35 of the cylinder 5. In addition, as the piston 6 is moved backward, a space or gap is provided between the forward or leading wall 25 of the piston 6 and the tapered cylinder wall portion 27. As a consequence of this gap, ink flows into a forward end portion 20 of the cylinder 5.

The cam follower groove 12 formed in the gear 11 is constructed and arranged so that the piston 6 moves backward during a suction stroke at a speed which is relatively less than the speed with which the piston 6 moves forward during a pumping stroke. As a consequence, the pressure drop of the ink as it travels from the reservoir 2 into the cylinder 5 are reduced. This assumes, of course, a constant speed of rotation of the drive motor 16.

As the piston 6 moves forward during a pumping stroke, the leading end portion 18 and the front wall 25 of the piston 6 engage the tapered cylinder wall portion 27, the outside diameter of the forward end portion of the piston 6 being greater than the smallest diameter of the tapered cylinder wall portion 27. After the leading edge of the piston 6 engages the tapered cylinder wall portion 27, to provide an exceptional seal therebetween, further forward movement of the piston 6 has the effect of radially deforming the forward end portion of the piston 6, thereby maintaining a good seal without the necessity for metal-to-metal engagement, piston rings or the like.

During the pumping stroke of the piston 6, and after the leading edge of the piston engages the tapered cylinder wall portion 27, further forward movement of the piston 6 has the effect of forcing the ink from cylinder portion 20 to the writing device 3. Thus the ink passes through a conduit or conductor line 28, thereby unseating a spring-loaded check valve 29. In the embodiment illustrated, the valve 29 is maintained in position by virtue of a screw 32 through which a passage 32' is formed, through which the ink passes as it continues its travel through a chamber 34 and thence a conduit 30 to the writing device 3.

Excess ink not immediately utilized by the writing device 3 flows back to the ink reservoir 2 by virtue of a return conduit 31.

In order to regulate the pressure of the ink being delivered to the writing device 3, the chamber 34 is enclosed in part by means of a flexible membrane $33_a$. The membrane $33_a$ forms a part of a wall member 33 which includes a pair of biasing members such as springs or the like indicated at reference numeral 22.

As will be apparent by those skilled in the art, the plastic membrane 8 moves in accordance with the movement of the piston 6. During a pumping stroke of the piston 6, as the piston moves forward, the corresponding forward movement of the membrane 8 produces a pressure condition in the cylinder portion 35 and in the capillary tube 24, as a consequence of which air bubbles which may be within the feed line 23 or the capillary tube 24 are forced upwardly into the reservoir 2. During backward movement of the membrane 8, some air may be initially drawn in with the ink through the capillary tube 24. Since the forward movement of the membrane 8 discharges the air, however, the system soon becomes air-free after the piston 6 has moved through several pumping and suction strokes.

As a consequence of the drive arrangement, including the cam gear 11 and the cam follower or roller 14, the ink can be pumped to the writing device 3 at relatively high pressures. Furthermore, this can be accomplished, in accordance with the principles of the present invention, without the utilization of piston rings or the like to provide the requisite good sealing effect between the piston 6 and the wall of the cylinder 5.

Although various minor modifications may be suggested by those versed in the art, it should be understood that we wish to employ within the scope of the patent warranted hereon all such modifications as reasonably and properly come within this scope of our contribution to the art.

We claim:

1. A pump mechanism for delivering ink or the like writing fluid from a reservoir to a writing device comprising a pump housing having an internal cylinder wall forming a cylinder, a piston disposed within said cylinder and slidable forward in a pumping stroke and backward in a suction stroke, and drive means for moving said piston through said pumping and suction strokes, said cylinder wall comprising a frusto-conical portion tapered inwardly in a direction away from said piston, and said piston comprising a plastic member having a forward end portion which cooperates with said tapered portion of said cylinder wall and which has an outside diameter which is greater than the smallest diameter of said tapered cylinder wall portion to slidingly engage the same in sealing relation as said piston moves forward during a pumping stroke, and to move out of engagement with the same as the piston moves backward in a suction stroke, said forward end portion of said piston having a forward facing recess formed therein permitting radially inward deformation of said forward end portion of said piston upon engagement thereof with said tapered cylinder wall portion.

2. The invention as defined in claim 1 and including a flexible membrane disposed within said cylinder and fixedly connected to said piston and to said housing for partitioning said cylinder.

3. The invention as defined in claim 1 and including chamber forming means forming a chamber in communication with one end of said cylinder located forward of said tapered cylinder wall portion, said chamber forming means comprising a spring biased wall member.

4. The invention as defined in claim 1 wherein said drive means comprises a motor driven rotatable cam member having a cam groove formed therewithin, a cam follower disposed within said groove and a piston rod drivingly interconnecting said cam follower and said piston.

5. The invention as defined in claim 4 wherein said cam and cam groove are constructed and arranged so that the speed of said piston during a pumping stroke is greater than during a suction stroke.

6. The invention as defined in claim 1 and including a reservoir for containing a supply of writing fluid, and a capillary tube interconnecting said reservoir and said cylinder for delivering writing fluid from the former to the latter.

7. The invention as defined in claim 6 wherein said capillary tube is made of glass.

* * * * *